United States Patent
Murota et al.

(10) Patent No.: US 9,337,692 B2
(45) Date of Patent: May 10, 2016

(54) PERMANENT MAGNET ROTOR WITH FLUX BARRIER FOR REDUCED DEMAGNETIZATION

(71) Applicant: NISSAN MOTOR CO., LTD., Yokohama-shi, Kanagawa (JP)

(72) Inventors: Kohei Murota, Kawasaki (JP); Tohru Nakada, Yokohama (JP); Shunji Oki, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 7 days.

(21) Appl. No.: 14/360,412

(22) PCT Filed: Oct. 12, 2012

(86) PCT No.: PCT/JP2012/076474
§ 371 (c)(1),
(2) Date: May 23, 2014

(87) PCT Pub. No.: WO2013/077109
PCT Pub. Date: May 30, 2013

(65) Prior Publication Data
US 2014/0292133 A1  Oct. 2, 2014

(30) Foreign Application Priority Data
Nov. 25, 2011  (JP) .................. 2011-257862

(51) Int. Cl.
*H02K 1/27* (2006.01)
*H02K 29/03* (2006.01)

(52) U.S. Cl.
CPC ................ *H02K 1/2766* (2013.01); *H02K 1/27* (2013.01); *H02K 1/276* (2013.01); *H02K 29/03* (2013.01)

(58) Field of Classification Search
CPC ....... H02K 1/276; H02K 1/2766; H02K 1/27; H02K 29/03
USPC ............. 310/156.83, 156.84, 156.01, 156.57, 310/156.53, 156.56
See application file for complete search history.

(56) References Cited

U.S. PATENT DOCUMENTS 7,923,882 B2 *   4/2011  Kalluf et al. ............. 310/156.83
2004/0178693 A1 *  9/2004  Burgbacher ........... H02K 1/276
                                                    310/216.064

(Continued)

FOREIGN PATENT DOCUMENTS

JP   2004-254396 A   9/2004
JP   2008-148391 A   6/2008

(Continued)

*Primary Examiner* — Terrance Kenerly
*Assistant Examiner* — Alexander Singh
(74) *Attorney, Agent, or Firm* — Foley & Lardner LLP (57) ABSTRACT

A flux barrier includes a radially outer proximate part and a radially inner proximate part that are a rotor radially outer side surface and a rotor radially inner side surface extending from a communicating part, at least one of the radially outer proximate part and the radially inner proximate part is connected to an end part of a magnet fixing part of a magnet hole in an inward direction of the magnet hole, and a projecting part projecting in an inward direction of the flux barrier is provided on at least one of the radially outer proximate part and the radially inner proximate part connected to the magnet fixing part. A constricted part in which a width of the flux barrier is narrower than on a side closer to the communicating part than the projecting part is formed by the projecting part.

4 Claims, 11 Drawing Sheets

(56) References Cited

U.S. PATENT DOCUMENTS

2009/0026865 A1* 1/2009 Aota et al. ............... 310/156.01
2010/0052455 A1* 3/2010 Feng et al. ............... 310/156.08

FOREIGN PATENT DOCUMENTS

| JP | 2008-278591 A | 11/2008 |
| WO | WO 2012/026032 A1 | 3/2012 |

* cited by examiner

(DISTANCE BETWEEN MAGNET END PART AND PROJECTING PART)/(LENGTH OF SURFACE WHERE PERMANENT MAGNET AND FLUX BARRIER ARE IN CONTACT)

PERMANENT MAGNET ROTOR WITH FLUX BARRIER FOR REDUCED DEMAGNETIZATION

TECHNICAL FIELD

The present invention relates to a motor in which permanent magnets are embedded in a rotor.

BACKGROUND ART

In an embedded magnet synchronous motor (so-called IPM motor) configured such that permanent magnets are embedded in a core (iron core) of a rotor, a structure has been proposed which prevents irreversible demagnetization of the permanent magnet.

A rotor is configured by inserting permanent magnets into a rotor core formed by laminating electromagnetic steel plates provided with a plurality of magnet holes. A gap portion (flux barriers) communicating with the magnet holes and configured to prevent irreversible demagnetization are provided on end parts of the magnet holes, into which the magnets are to be inserted, in a circumferential direction of the rotor (end parts in a rotating direction).

In a rotor disclosed in JP2008-148391A, a flux barrier includes an outer periphery proximate part closer to a rotor outer periphery than a part of a permanent magnet closest to the rotor outer periphery and is shaped to have a part distant from the rotor outer periphery on a rotor inner peripheral side with respect to an extension line of an outer part of the permanent magnet between the outer periphery proximate part and the part of the permanent magnet closest to the rotor outer periphery. Thus, a magnetic flux propagating from a q-axis side end part of the permanent magnet toward the flux barrier propagates toward a position between the outer periphery proximate part and the rotor outer periphery after entering a core of a rotor from the flux barrier. As a result, the propagation of the magnetic flux in a direction to disturb an arrangement direction of a magnetic dipole of the permanent magnet is suppressed and irreversible demagnetization hardly occurs.

SUMMARY OF INVENTION

The above conventional technology is configured to suppress irreversible demagnetization for the end part of the permanent magnet by the shape of the flux barrier part. On the other hand, the magnet hole has to be formed to include a radially inner side surface and a radially outer side surface facing outer and inner side surfaces of the permanent magnet in a rotor radial direction to radially position the permanent magnet and a circumferential surface extending from at least one of the radially outer side surface and the radially inner side surface and facing a circumferential end surface of the permanent magnet to position and fix the permanent magnet in a rotor circumferential direction. Thus, in the rotor core disclosed in the above conventional technology, a part where the rotor core and the permanent magnet face (hereinafter, also referred to as a magnet fixing part) on the end part of the permanent magnet in the rotor circumferential direction is provided to fix the position of the permanent magnet, and irreversible demagnetization of the permanent magnet occurring due to the influence of a magnetic flux having entered the rotor from a stator on the permanent magnet via this magnet fixing part is not considered.

Particularly, since irreversible demagnetization of the permanent magnet end part is suppressed only by the shape of the outer peripheral side of the rotor core in the conventional technology, there is no mentioning of the shape of the inner peripheral side of the rotor core.

The present invention was developed in view of such a problem and aims to provide a motor represented by an IPM motor and capable of suppressing irreversible demagnetization of permanent magnets.

One aspect of the present invention is applied to a motor with a stator around which a winding wire is wound, and a rotor housed in the stator and including a plurality of permanent magnets. In this motor, the rotor is perforated with magnet holes for embedding the permanent magnets and flux barriers communicating with end parts of the magnet holes in a rotor circumferential direction. Each magnet hole includes an outer side surface facing an outer side surface of the permanent magnet in a rotor radial direction, an inner side surface facing an inner side surface of the permanent magnet in the rotor radial direction, a magnet fixing part extending from at least one of the radially outer side surface and the radially inner side surface of the permanent magnet and facing a circumferential end surface of the permanent magnet, and a communicating part communicating with the flux barrier. On the other hand, each flux barrier communicating with the magnet hole includes a radially outer proximate part and a radially inner proximate part that are a rotor radially outer side surface and a rotor radially inner side surface extending from the communicating part, at least one of the radially outer proximate part and the radially inner proximate part is connected to an end part of the magnet fixing part of the magnet hole in an inward direction of the magnet hole, and a projecting part projecting in an inward direction of the flux barrier is provided at a position of at least one of the radially outer proximate part and the radially inner proximate part connected to the magnet fixing part outwardly of the communicating part in the rotor circumferential direction to form a constricted part in which a width of the flux barrier is narrower than on a side closer to the communicating part than the projecting part.

Embodiments and advantages of the present invention are described in detail below with reference to the accompanying drawings.

DESCRIPTION OF EMBODIMENTS

First Embodiment

Figure 1:
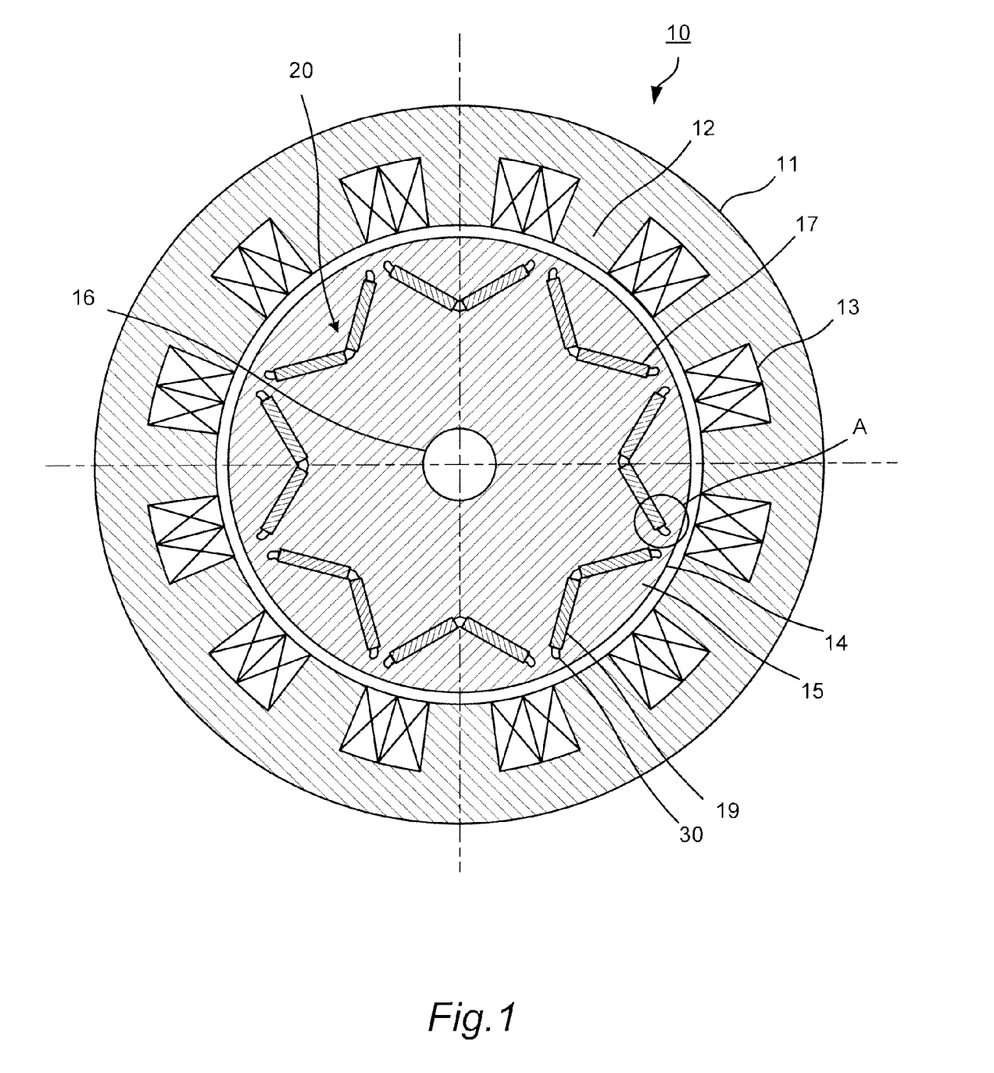
FIG. 1 is a view showing essential parts of a rotor and a stator of a motor according to a first embodiment of the present invention.

FIG. 1 is a view showing essential parts of a rotor and a stator of a motor 10 of a first embodiment of the present invention.

As shown in FIG. 1, the motor 10 is composed of a stator 11 and a rotor 14.

The stator 11 has a substantially hollow cylindrical shape and a plurality of teeth 12 projecting radially inwardly are provided at equal intervals. Winding wires (coils) 13 are wound in slots between the teeth 12. A winding method of the coils 13 may be distributed winding or concentrated winding. The stator 11 is formed by laminating thin electromagnetic steel plates in a rotation axis direction.

The substantially solid cylindrical rotor 14 is inserted in a hollow space radially inwardly of the hollow cylindrical stator 11. The rotor 14 is composed of a rotor core 15 formed by laminating thin electromagnetic steel plates in the rotation axis direction and a rotary shaft 16 inserted into a center of the rotor core 15.

Permanent magnets 17 are embedded in the rotor core 15 in accordance with a predetermined rule in a circumferential direction (rotor rotating direction). The rotor core 15 is perforated with a plurality of magnet holes 19 penetrating along the rotary shaft, and the permanent magnet 17 is embedded in each of the magnet holes 19. The rotating direction of the rotor core is referred to as a circumferential direction and a rotor core radial direction is referred to as a radial direction below.

In the rotor core 15, one magnet part 20 is formed by a pair of permanent magnets 17. In the magnet part 20, the pair of permanent magnets 17 are provided to form a V shape and an opening side of the V shape is arranged to face a radially outer side of the rotor core 15. Although the rotor in which each pair of permanent magnets 17 are arranged in a V shape is described in this embodiment, a rotor in which each permanent magnet is arranged in a direction perpendicular to the radial direction may also be used.

Each permanent magnet 17 is so magnetized that one magnetic pole (e.g. N-pole) is oriented toward the radially outer side of the rotor core 15 and the other magnetic pole (e.g. S-pole) is oriented toward a radially inner side. By this arrangement, the pair of permanent magnets 17 arranged in this magnet part 20 function as one permanent magnet.

In this embodiment, eight magnet parts 20 are arranged in the circumferential direction in the rotor core 15 as shown in FIG. 1. Different magnetic poles are oriented in adjacent ones of the magnet parts 20. Specifically, if an N-pole is oriented toward the radially outer side and an S-pole is oriented toward the radially inner side in a certain magnet part 20, an S-pole and an N-pole are oriented toward the radially outer side and radially inner side in the adjacent magnet part 20.

By such a configuration, a magnetic force acts on each magnet part 20 of the rotor 14 and the rotor 14 rotates in the motor 10 by applying a current to the coils 13 of the stator 11. The rotation of the rotor 14 is taken out from the rotary shaft 16 rotatably supported on an unillustrated case.

Figure 2:
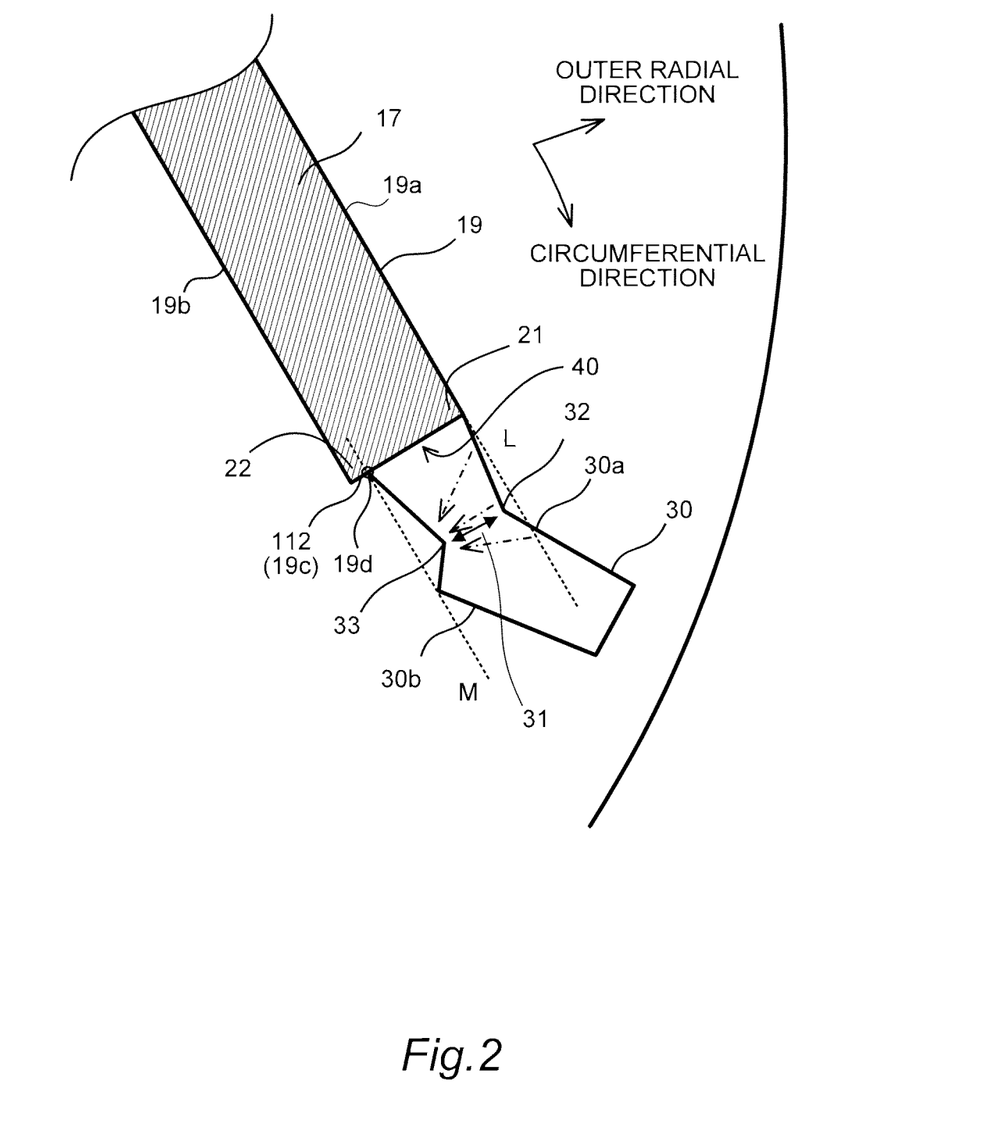
FIG. 2 is a view centered on a flux barrier of the first embodiment of the present invention.

In the rotor core 15, a flux barrier 30 which is a gap portion communicating with the magnet hole at a communicating part 40 of FIG. 2 and protruding in the circumferential direction is provided at a circumferential end part of the magnet hole 19. The flux barrier 30 is provided to suppress the occurrence of irreversible demagnetization caused by a magnetic flux sneaking near the end part of the permanent magnet 17 and prevent a reduction in the efficiency of the motor.

FIG. 2 is an enlarged view of a range A of FIG. 1 of the present embodiment and a view centered on the flux barrier 30.

Here, one of a pair of flux barriers 30 present on opposite end sides of the magnet part 20 is described. The shape and function of the other flux barrier are the same.

The flux barrier 30 is shaped to extend toward a circumferentially outer side from the permanent magnet 17 inserted in the magnet hole 19 of the rotor core 15.

The magnet hole 19 has a radially outer side surface 19a facing an outer surface of the permanent magnet 17 in the rotor radial direction, a radially inner side surface 19b facing an inner side surface of the permanent magnet 17 in the rotor radial direction and a circumferential surface 19c extending from an end part of the radially inner side surface 19b in the rotor circumferential direction and facing an end surface 22 of the permanent magnet 17 in the rotor circumferential direction, and communicates with the flux barrier 30 at the communicating part 40. Accordingly, a magnet hole inner end part 19d of the circumferential surface 19c is located at an inner side of the radially inner side surface 19b in the magnet hole, and the communicating part 40 is narrower than the permanent magnet 17 in a plate thickness direction (magnetization direction). The circumferential surface 19c of the magnet hole 19 has a function of positioning and fixing the end surface 22 of the permanent magnet 17 in the rotor circumferential direction by being engaged therewith, and is also referred to as a magnet fixing part 112 below.

A radial outer proximate part 30a, which is a surface of a rotor radially outer side of the flux barrier 30, has a projecting part 32 connected to the radially outer side surface 19a of the magnet hole 19, extending outward in the rotor circumferential direction and projecting radially inwardly of the rotor core 15 with respect to an extension line L of a radially outer end part of the permanent magnet 17.

A radially inner proximate part 30b, which is a surface of a rotor radially inner side of the flux barrier 30, has a projecting part 33 connected to the circumferential surface 19c of the magnet hole 19, extending outward in the rotor circumferential direction from the magnet hole inner end part 19d of the circumferential surface 19c and projecting toward an outer peripheral side of the rotor core 15 with respect to an extension line M parallel to the extension line L of the radially outer side surface of the permanent magnet 17 and passing through the magnet hole inner end part 19d of the magnet hole 19 (projecting into the flux barrier).

The projecting parts 32, 33 are formed at positions facing each other in the flux barrier 30. A constricted part 31 in which a width of the flux barrier 30 is narrower than on a side closer to the communicating part 40 than the projecting parts 32, 33 is formed by the projecting parts 32, 33.

The width of the flux barrier 30 is gradually narrowed by the constricted part 31 formed by the projecting parts 32, 33 as the flux barrier 30 extends toward a circumferentially outer side of the rotor core 15 from the magnet end parts 21, 22 (as the flux barrier 30 extends from the communicating part 40 toward the circumferentially outer side of the rotor core 15). On a side further circumferentially outwardly of the constricted part, the width is enlarged and, thereafter, the flux barrier 30 extends a predetermined length while keeping the enlarged width.

Figure 3:
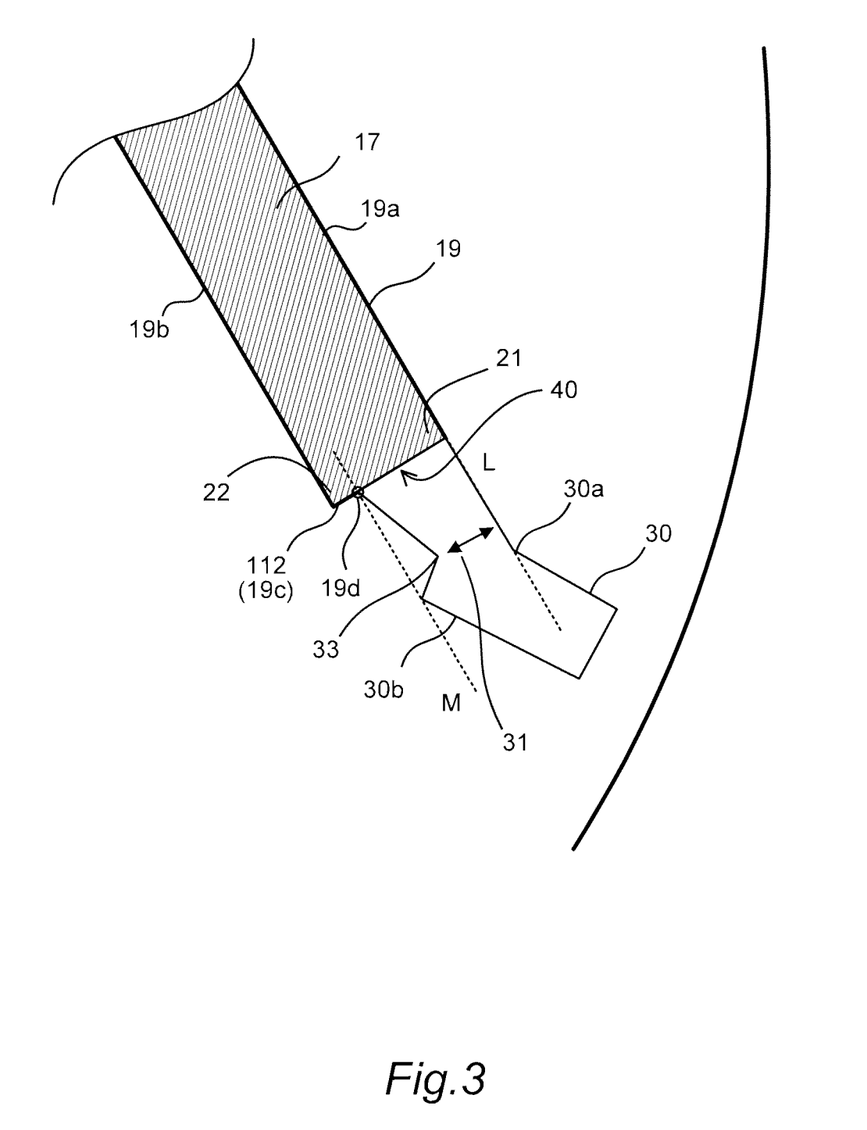
FIG. 3 is a view centered on a flux barrier of a modification of the first embodiment of the present invention.

FIG. 3 is a view centered on a flux barrier 30 according to a modification of the first embodiment and an enlarged view of the range A of FIG. 1.

In an example shown in FIG. 2, the constricted part 31 is formed by the projecting part 32 of the radially outer proximate part 30a and the projecting part 33 of the radially inner proximate part 30b.

On the other hand, in an example shown in FIG. 3, the radially outer proximate part 30a is formed in an extending direction, which is substantially the same as the extension line L on the outer peripheral side of the permanent magnet 17, and the projecting part 33 projects only from the radially inner proximate part 30b. By such a configuration, a constricted part 31 is formed by the projecting part 33 and the radially outer proximate part 30a.

As described above, the following effects can be obtained in the first embodiment of the present application.

By shaping the flux barrier 30 as shown in FIG. 2 or 3, irreversible demagnetization of the circumferential end part of the permanent magnet 17 can be suppressed.

Specifically, by forming the constricted part 31 by the projecting part 33 projecting inwardly of the flux barrier 30 from the radially inner proximate part 30b, a magnetic flux propagating from the radially outer proximate part 30a of the flux barrier 30 toward the radially inner proximate part 30b is guided to the constricted part 31 to suppress an irregular flow of the magnetic flux near the magnet end part 21.

Conventionally, magnetic fluxes generated by a current flowing in the coil 13 of the stator 11 pass from the radially outer side to the radially inner side of the permanent magnet 17 after entering the rotor core 15 from the stator 11. At this time, a magnetic flux passing from the radially outer side (radially outer proximate part 30a) to the radially inner side (radially inner proximate part 30b) of the flux barrier 30 and flowing to the magnet end part 22 of the permanent magnet 17 via the magnet fixing part 112 (circumferential surface 19c) is generated near the magnet end part 21 of the permanent magnet 17. This magnetic flux affects the permanent magnet 17, whereby irreversible demagnetization occurs in the magnet end parts 21, 22. If, for example, the projecting part 32 is formed only on the side of the radially outer proximate part 30a of the flux barrier 30 (one not connected to the magnet fixing part 112 out of the radially outer proximate part 30a and the radially inner proximate part 30b) to suppress this, a magnetic flux near the magnet end part 21 is guided toward the projecting part 32 and passes through the radially inner proximate part 30b via the projecting part 32, whereby irreversible demagnetization in the magnet end part 21 can be suppressed. However, since the flow of a magnetic flux toward the magnet fixing part 112 (circumferential surface 19c) that affects the magnet end part 22 cannot be suppressed, irreversible demagnetization occurs in the magnet end part 22.

In the first embodiment of the present invention, the constricted part 31 is formed by forming the projecting part 33 projecting from the radially inner proximate part 30b (one connected to the magnet fixing part 112 out of the radially outer proximate part 30a and the radially inner proximate part 30b) of the flux barrier 30. In this constricted part 31, a path in which a magnetic flux flows from the outer peripheral side to the radially inner side of the rotor core 15 is formed as shown by dashed-dotted line in FIG. 2. By such a configuration, irreversible demagnetization in the magnet end parts 21, 22 of the permanent magnet 17 can be suppressed. Specifically, the constricted part 31 is formed by forming the projecting part 33 projecting inwardly of the flux barrier 30 from the radially inner proximate part 30b connected to the magnet fixing part 112 (circumferential surface 19c) out of the radially outer proximate part 30a and the radially inner proximate part 30b of the flux barrier 30. In this way, the flow of the magnetic flux from the stator 11 that affects the magnet end parts 21, 22 can be guided to the constricted part 31 and irreversible demagnetization not only in the magnet end part 21 of the permanent magnet 17, but also in the magnet end part 22 can be suppressed.

As just described, by forming the projecting part 33 projecting inwardly of the flux barrier 30 from the radially inner proximate part 30b connected to the magnet fixing part 112 (circumferential surface 19c) out of the radially outer proximate part 30a and the radially inner proximate part 30b of the flux barrier 30 to form the constricted part 31, irreversible demagnetization of the permanent magnet 17 can be suppressed, with the result that a maximum value of a current that can flow in the coil 13 of the stator 11 can be increased. Therefore, a torque that can be generated by the motor 10 can be increased.

Second Embodiment

Next, a second embodiment is described.

In the above first embodiment, irreversible demagnetization is suppressed by forming the projecting part 33 projecting inwardly of the flux barrier 30 from the radially inner proximate part 30b connected to the magnet fixing part 112 (circumferential surface 19c) out of the radially outer proximate part 30a and the radially inner proximate part 30b of the flux barrier 30 to form the constricted part 31 in the flux barrier 30. In the second embodiment, the shape of the constricted part 31 is further changed. The same components as in the first embodiment are denoted by the same reference signs and not described.

Figure 4:
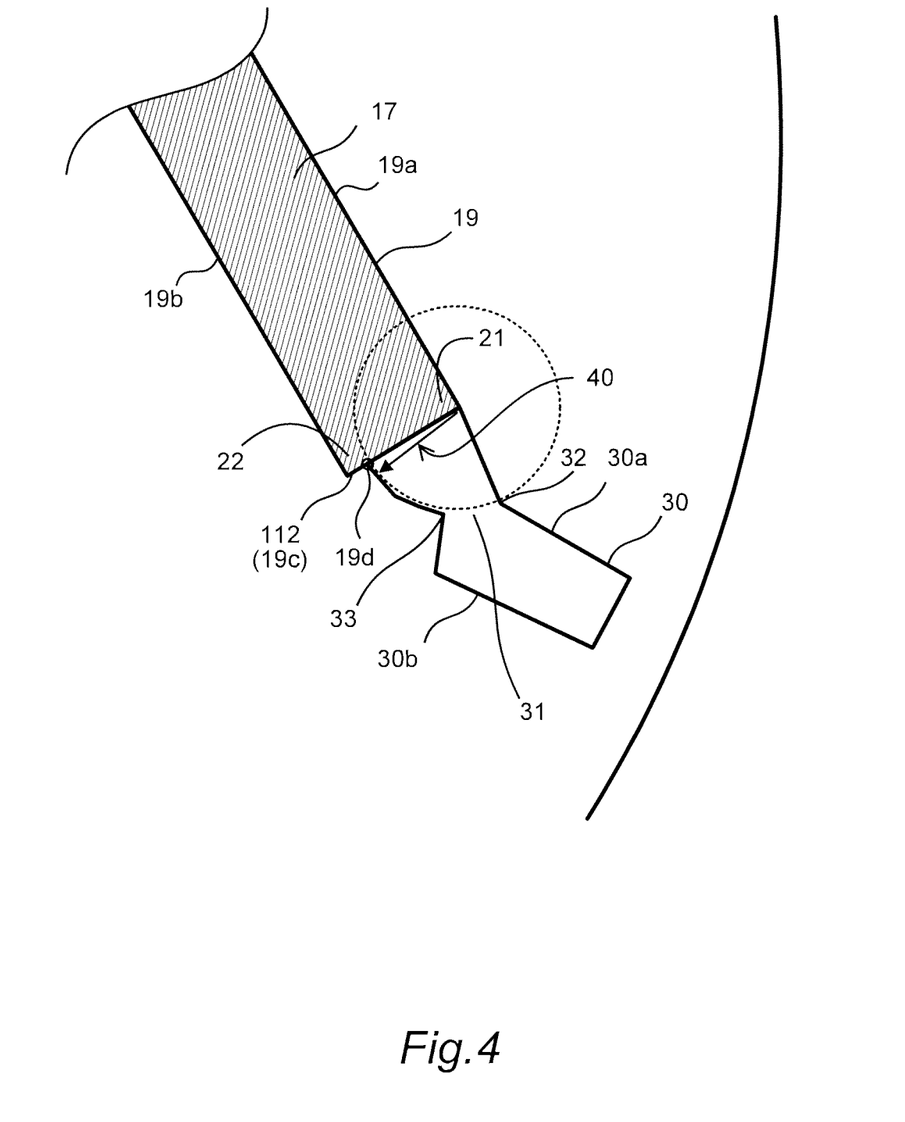
FIG. 4 is a view centered on a flux barrier of a second embodiment of the present invention.

FIG. 4 is a view centered on a flux barrier 30 of a second embodiment of the present invention and an enlarged view of the range A of FIG. 1.

In the second embodiment, a distance between a projecting part 33 projecting from a radially inner proximate part 30b of the flux barrier 30 and a magnet end part 21 is set to be not shorter than a length of a part where a permanent magnet 17 and the flux barrier 30 are in contact. In other words, the distance between the projecting part 33 and the magnet end part 21 is set to be not shorter than a distance between a magnet hole inner end part 19d of a magnet fixing part 112 and the magnet end part 21 (width of a communicating part 40).

Specifically, the projecting part 33 is so shaped as not be present inside a circumference (shown by dotted line in FIG. 4) centered on the magnet end part 21 and having the length of the part where the permanent magnet 17 and the flux barrier 30 are in contact as a radius.

By configuring the flux barrier 30 in this way, irreversible demagnetization in the magnet end parts 21, 22 can be suppressed.

Figure 5:
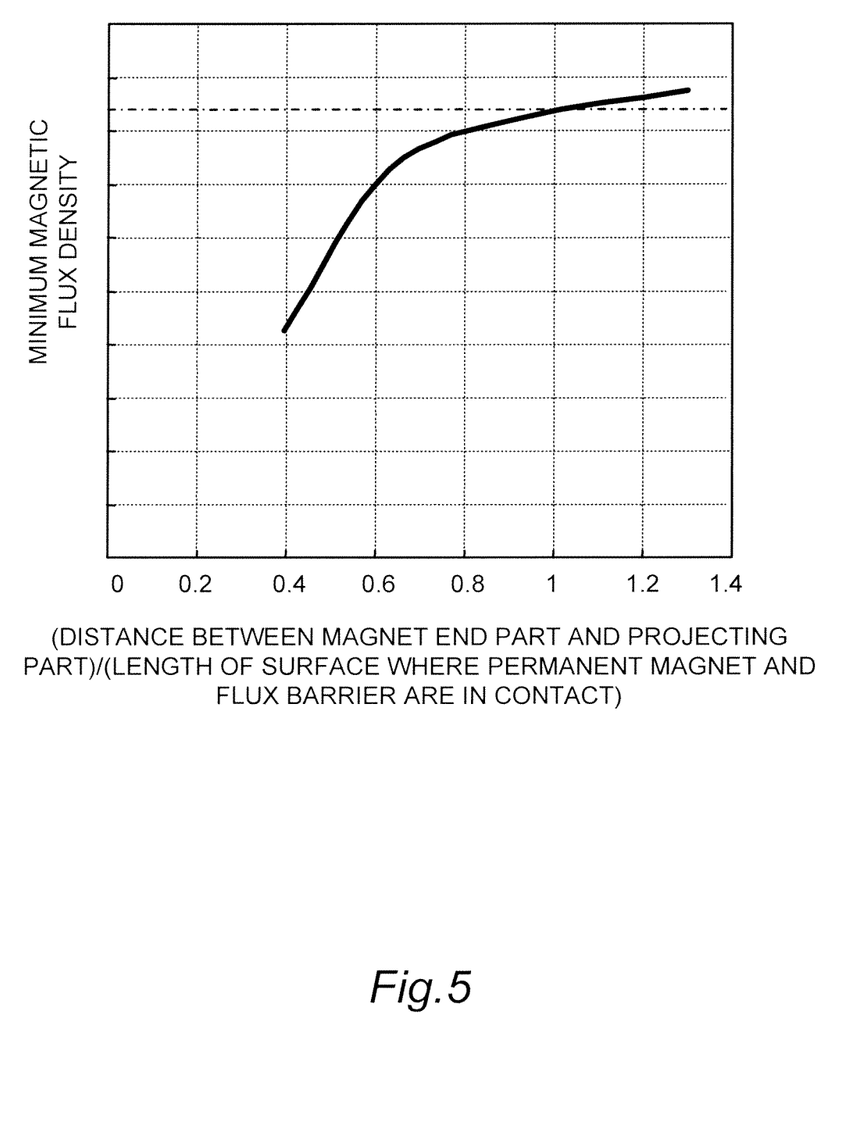
FIG. 5 is a graph of a minimum magnetic flux density of a magnet end part of the second embodiment of the present invention.

This is more specifically described with reference to a graph of FIG. 5 showing a minimum magnetic flux density in the magnet end part 21.

FIG. 5 is a graph plotting a minimum magnetic flux density of the magnet end part 21 with an X axis representing how far the magnet end part 21 and the projecting part 33 are from each other when a length of a surface of the part where the permanent magnet 17 and the flux barrier 30 are in contact (width of the communicating part 40) is 1 and a Y axis representing the minimum magnetic flux density of the magnet end part 21.

It should be noted that the minimum magnetic flux density means the occurrence of irreversible demagnetization at or below a knick point of a magnet material. It is indicated in the graph shown in FIG. 5 that irreversible demagnetization is more likely to occur as the graph goes downward.

With reference to FIG. 5, the minimum magnetic flux density in the magnet end part 21 decreases as the distance between the magnet end part 21 and the projecting part 33 decreases. Specifically, it can be said that the shorter the distance between the magnet end part 21 and the projecting part 33 is, the more likely irreversible demagnetization occurs.

Here, a minimum magnetic flux density in the conventional configuration in which the projecting part 32 is formed from the side of the radially outer proximate part 30a of the flux barrier 30 is represented by a dashed-dotted line. It becomes clear that irreversible demagnetization can be suppressed more than in the conventional configuration in a region above this dashed-dotted line, i.e. when the distance between the magnet end part 21 and the projecting part 33 is not shorter than 1. This is thought to be because the flow of a magnetic flux from a stator 11 that affects the magnet end part 21 is guided to pass through the projecting part 33 (from a side circumferentially outwardly of the magnet end part 21) after passing through the rotor core radially outwardly of the flux barrier 30 by setting the distance between the magnet end part 21 and the projecting part 33 to be not shorter than the width of the communicating part 40, whereby the magnetic flux passing through the vicinity of the magnet end part 21 can be decreased.

As just described, in the second embodiment, irreversible demagnetization can be suppressed by setting the distance between the projecting part 33 and the magnet end part 21 to be not shorter than the length of the part where the permanent magnet 17 and the flux barrier 30 are in contact (not shorter than the width of the communicating part 40). By suppressing irreversible demagnetization, the amount of a current flowing in a coil 13 of the stator 11 can be increased, wherefore a torque of a motor 10 can be increased.

Third Embodiment

Next, a third embodiment is described.

The above second embodiment is characterized by the shape of the projecting part 33 of the flux barrier 30. In the third embodiment, the shape of the projecting part 33 is further changed from that of the above second embodiment. It should be noted that the same components as in the first or second embodiment are denoted by the same reference signs and not described.

Figure 6:
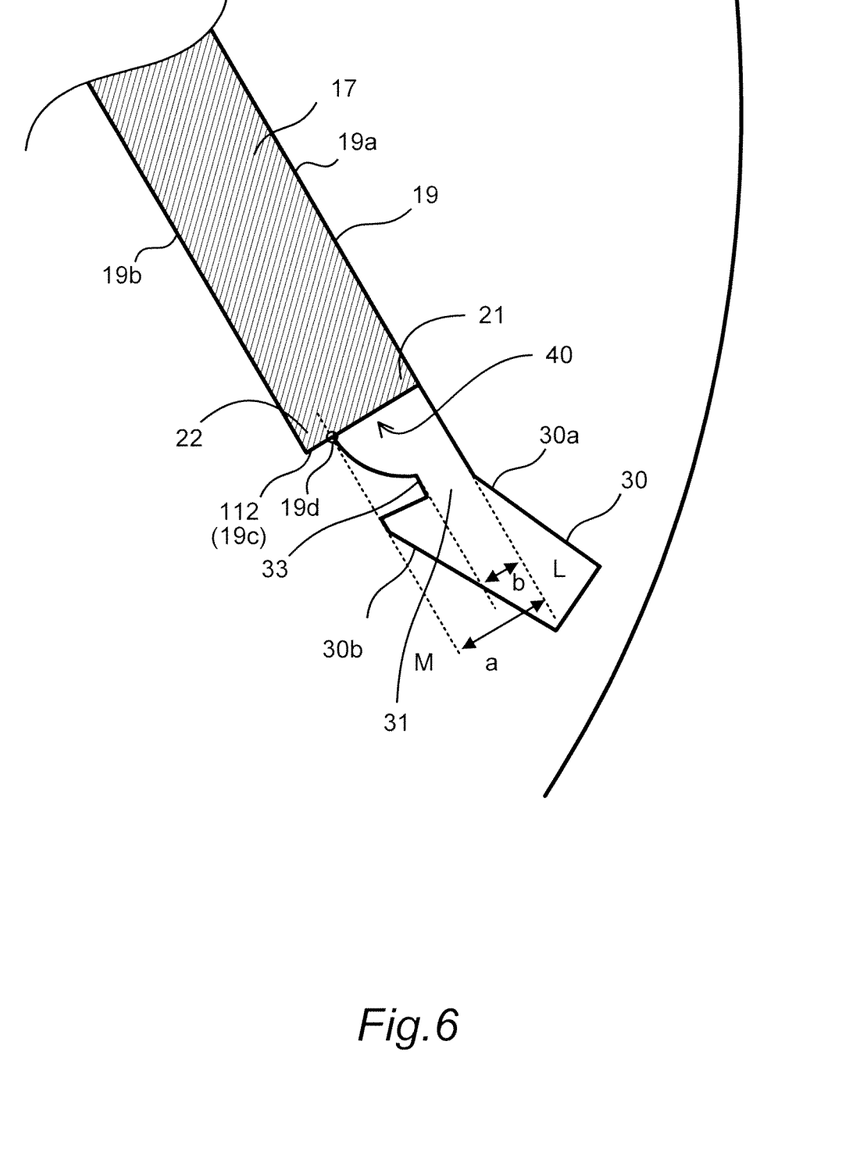
FIG. 6 is a view centered on a flux barrier of a third embodiment of the present invention.

FIG. 6 is a view centered on a flux barrier 30 of a third embodiment of the present invention and an enlarged view of the range A of FIG. 1.

The shape of a projecting part 33 projecting from a radially inner proximate part 30b is described.

A length of a part where a permanent magnet 17 and the flux barrier 30 are in contact (width of a communicating part 40) is denoted by a. A distance (width) of a constricted part 31 between the projecting part 33 projecting from the radially inner proximate part 30b and a radially outer proximate part 30a is denoted by b.

In the third embodiment, a ratio b/a of b to a is set within a range of equal to or larger than 0.7 and below 1. By configuring the flux barrier 30 in this way, irreversible demagnetization in magnet end parts 21, 22 can be suppressed.

Figure 7:
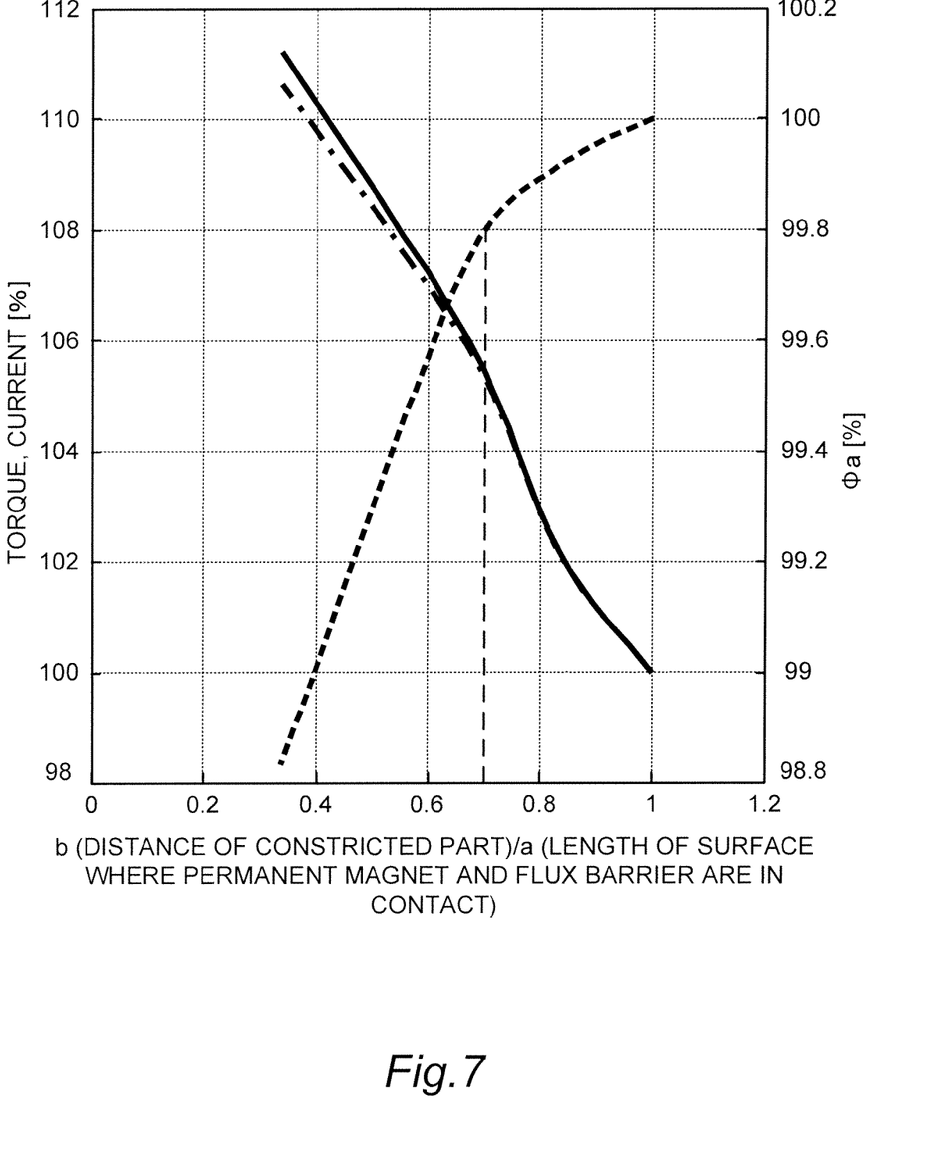
FIG. 7 is a graph showing an interlinkage magnetic flux and a current amount applicable at a maximum torque according to the third embodiment of the present invention.

This is more specifically described with reference to a graph of FIG. 7 showing a relationship of an interlinkage magnetic flux φa, a maximum torque of a motor 10 and a current applicable to a coil 13 of a stator 11.

FIG. 7 is a graph plotting the interlinkage magnetic flux φa (dotted line), the maximum torque (solid line) of the motor 10 and the amount of the current (dashed-dotted line) applicable to the coil 13 of the stator 11 with an X-axis representing the ratio of the distance b of the constricted part 31 to the length a of the part where the permanent magnet 17 and the flux barrier 30 are in contact (width of the communicating part 40) and Y-axes representing the interlinkage magnetic flux, the maximum torque and the amount of the current.

The interlinkage magnetic flux φa means a magnet magnetic flux contributing to a magnet torque in the motor 10. If the same current flows in the coil 13 of the stator 11, the magnet torque increases as the interlinkage magnetic flux φa in a rotor core 15 increases. Thus, efficiency in increasing the torque of the motor 10 increases. On the other hand, since a motor output decreases if the interlinkage magnetic flux φa decreases, a configuration for preventing a decrease in the interlinkage magnetic flux φa as much as possible is preferable.

An applicable current is a rate of increasing the current amount from a specified current amount based on demagnetization resistance performance of the permanent magnet 17 in the rotor 14 with respect to the amount of the current applied to the motor 10.

The maximum torque is a maximum torque that can be output by the motor 10 based on conditions such as the amount of the applied current and the interlinkage magnetic flux.

Since a path for magnetic flux is formed as described above if the distance b of the constricted part 31 is short, the occurrence of irreversible demagnetization in the end parts 21, 22 of the permanent magnet 17 can be suppressed. Thus, the amount of the current applicable to the coil 13 of the stator 11 can be increased and the maximum torque capable of being output also increases as the distance b of the constricted part 31 decreases.

On the other hand, the interlinkage magnetic flux φa decreases as the distance b of the constricted part 31 decreases. If the interlinkage magnetic flux φa decreases, the efficiency of the motor 10 decreases and the maximum torque decreases.

In the graph shown in FIG. 7, the interlinkage magnetic flux φa moderately decreases in a region where the ratio (b/a) of the distance b of the constricted part 31 to the length a of the part where the permanent magnet 17 and the flux barrier 30 are in contact is 1 to 0.7. However, if b/a is smaller than around 0.7, the interlinkage magnetic flux φa largely decreases depending on the value of b/a. Thus, b/a is preferably set within the range of 0.7 to 1 to suppress a decrease in the interlinkage magnetic flux φa to a minimum level while suppressing a reduction in the minimum magnetic flux density.

As just described, in the third embodiment, irreversible demagnetization in the magnet end parts 21, 22 of the permanent magnet 17 can be suppressed by setting the ratio b/a of the distance b of the constricted part 31 to the length a of the part where the permanent magnet 17 and the flux barrier 30 are in contact within the range of equal to or larger than 0.7 and below 1. By suppressing irreversible demagnetization, the amount of the current flowing in the coil 13 of the stator 11 can be increased, wherefore the torque of the motor 10 can be increased.

Fourth Embodiment

Next, a fourth embodiment is described.

The above second and third embodiments are characterized by the shape of the projecting part 33 of the flux barrier 30. In the fourth embodiment, the shape of the projecting part 33 is further changed from that of the above third embodiment. It should be noted that the same components as in the first to third embodiments are denoted by the same reference signs and not described.

Figure 8:
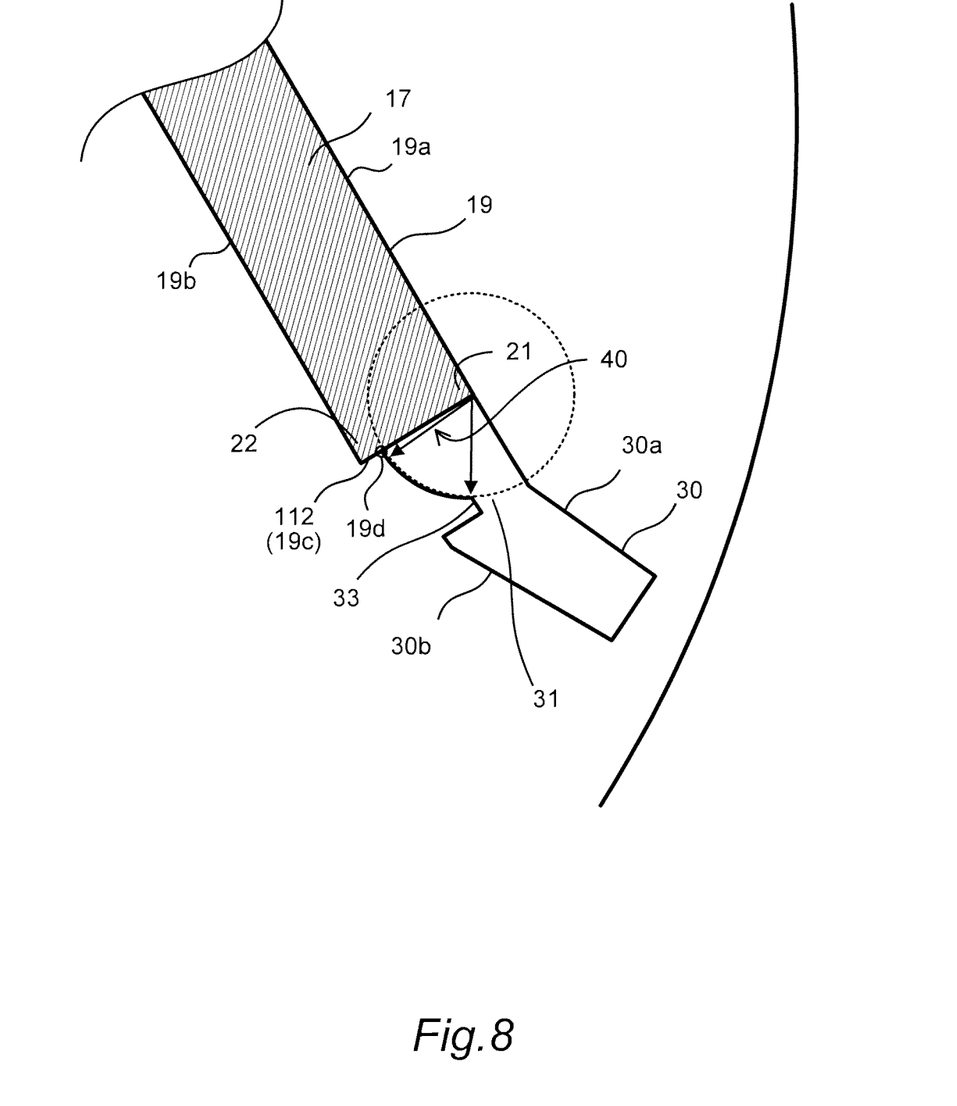
FIG. 8 is a view centered on a flux barrier of a fourth embodiment of the present invention.

FIG. 8 is a view centered on a flux barrier 30 of the fourth embodiment of the present invention and an enlarged view of the range A of FIG. 1.

In the third embodiment, the projecting part 33 projecting from a radially inner proximate part 30b of the flux barrier 30 is so shaped as to be partly located on a circumference distant from the magnet end part 21 by a length of a part where a permanent magnet 17 and the flux barrier 30 are in contact.

Specifically, the projecting part 33 is so shaped as to be at least partly tangent to the circumference centered on the magnet end part 21 and having the length of the part where the permanent magnet 17 and the flux barrier 30 are in contact as a radius. The projecting part 33 may be so shaped that the radially inner proximate part 30b of the flux barrier 30 extends along this circumference or may be so shaped as to be partly tangent to this circumference.

By configuring the flux barrier 30 in this way, irreversible demagnetization in the magnet end parts 21, 22 can be suppressed.

Figure 9:
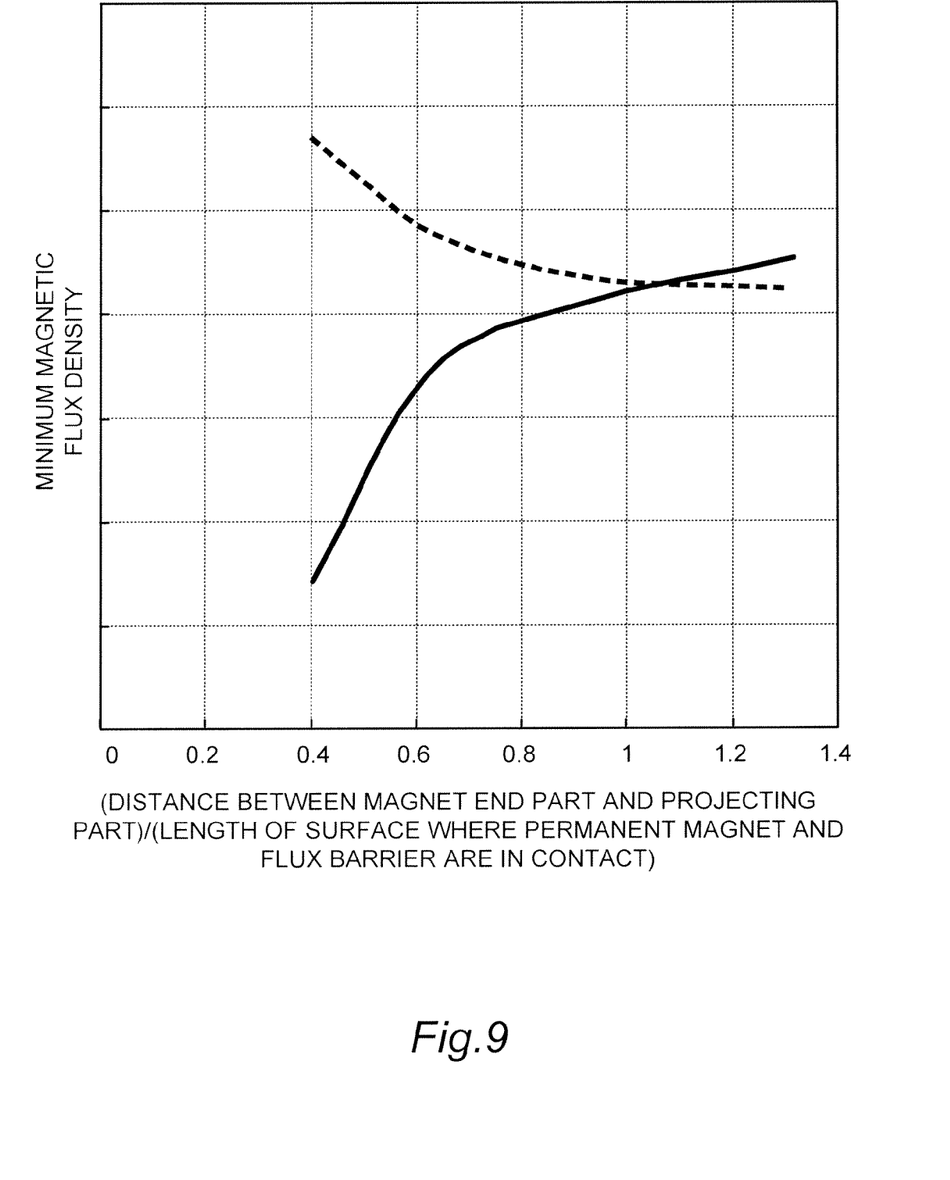
FIG. 9 is a graph of a minimum magnetic flux density of a magnet end part of the fourth embodiment of the present invention.

This is more specifically described with reference to a graph of FIG. 9 showing a minimum magnetic flux density in the magnet end part 21.

FIG. 9 is a graph plotting a minimum magnetic flux density of the magnet end part 21 and a minimum magnetic flux density of the magnet end part 22 with an X axis representing how far the magnet end part 21 and the projecting part 33 are from each other when a length of a surface of the part where the permanent magnet 17 and the flux barrier 30 are in contact (width of the communicating part 40) is 1 and a Y axis representing the minimum magnetic flux density. It should be noted that the minimum magnetic flux density of the magnet end part 21 is represented by a solid line and that of the magnet end part 22 is represented by a dotted line.

With reference to FIG. 9, the minimum magnetic flux density in the magnet end part 21 decreases as the distance between the magnet end part 21 and the projecting part 33 decreases. On the other hand, the minimum magnetic flux density in the magnet end part 22 is substantially constant or slightly increases as the distance between the magnet end part 21 and the projecting part 33 decreases. It can be said that the shorter the distance between the magnet end part 21 and the projecting part 33 is, the lower the minimum magnetic flux density in the magnet end part 21 becomes and the more likely irreversible demagnetization occurs. On the other hand, it can be said that the minimum magnetic flux density does not decrease and irreversible demagnetization hardly occurs in the magnet end part 22.

Accordingly, the projecting part 33 is so set that the minimum magnetic flux densities of the magnet end parts 21, 22 are balanced at an equivalent level, i.e. the length of the surface of the part where the permanent magnet 17 and the flux barrier 30 are in contact (width of the communicating part 40) and the distance between the magnet end part 21 and the projecting part 33 are equal (ratio is 1). This enables irreversible demagnetization to be more effectively suppressed in the both magnet end parts 21 and 22. By suppressing irreversible demagnetization, the maximum amount of a current that can flow in a coil 13 of a stator 11 can be increased, wherefore the torque that can be output by the motor 10 can be increased.

Next, modifications of the present invention are described.

Figure 10A:
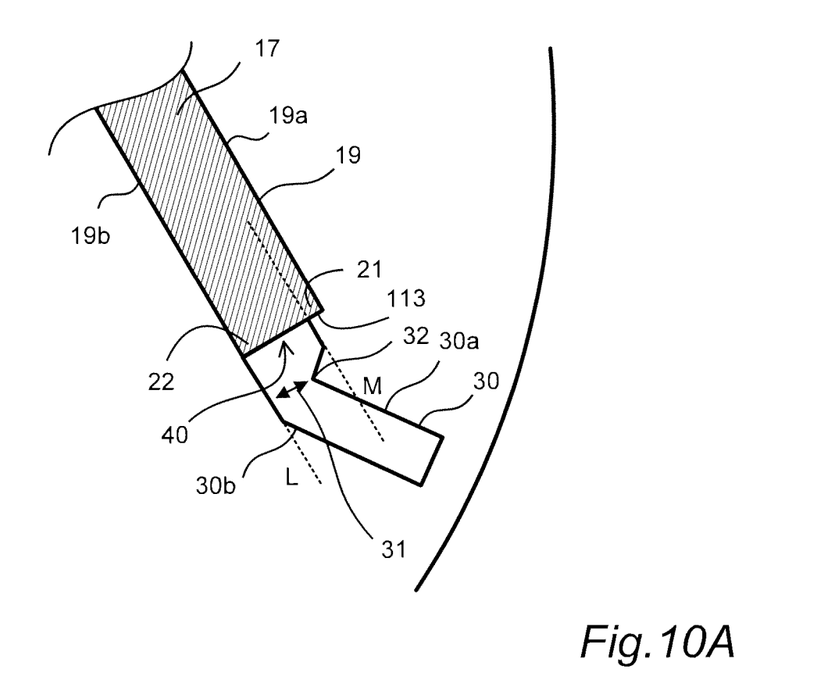
FIG. 10A is a view showing a modification of the embodiments of the present invention.
Figure 10B:
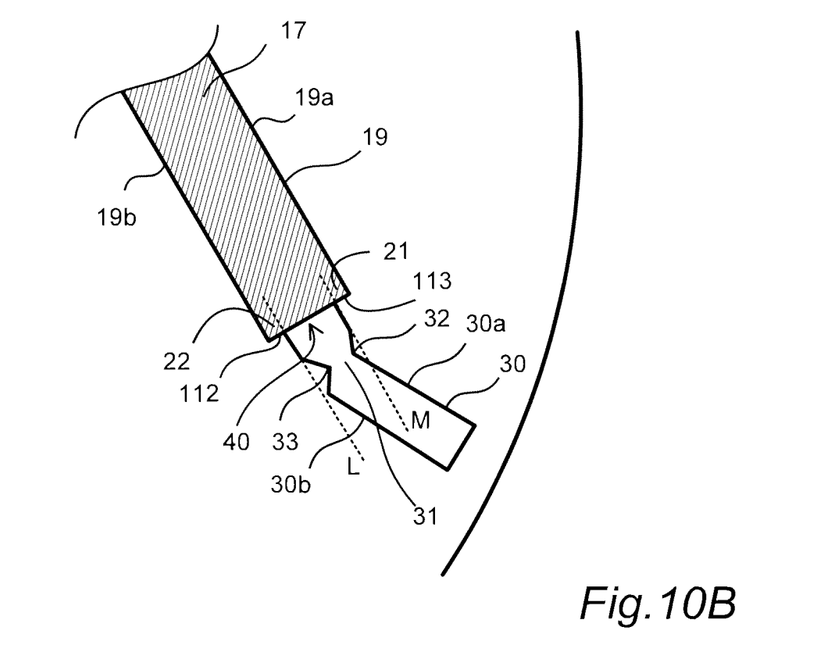
FIG. 10B is a view showing a modification of the embodiment of the present invention.

FIGS. 10A and 10B are views showing modifications of the embodiments of the present invention.

In the embodiments of the present invention described above, the magnet fixing part 112 extends from the circumferential end part of the radially inner side surface 19b of the magnet hole 19, the projecting part 33 connected to this magnet fixing part 112 is formed on the side of the radially inner proximate part 30b of the flux barrier 30, and the constricted part 31 is formed in the flux barrier 30 by this projecting part 33.

Contrary to this, in the modification shown in FIG. 10A, a magnet fixing part 113 extends from a circumferential end part of a radially outer side surface 19a of a magnet hole 19, a projecting part 32 connected to this magnet fixing part 113 is formed on the side of a radially outer proximate part 30a of a flux barrier 30 and a constricted part 31 is formed in the flux barrier 30 by this projecting part 32.

In the modification shown in FIG. 10B, a projecting part 33 is formed on the side of a radially inner proximate part 30b connected to a magnet fixing part 112, a projecting part 32 is formed on a radially outer proximate part 30a connected to a magnet fixing part 113 and a constricted part 31 is formed in a flux barrier 30 by these projecting parts 32, 33.

Also by such configurations, irreversible demagnetization in the end parts 21, 22 of the permanent magnet 17 can be similarly suppressed as described above.

Figure 11A:
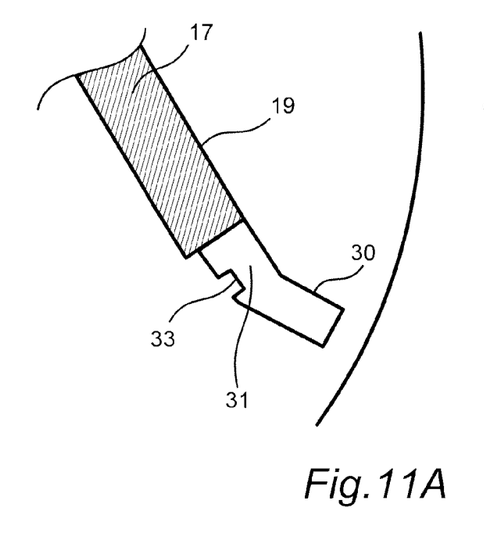
FIG. 11A is a view showing a modification of a projecting part in the embodiments of the present invention.
Figure 11B:
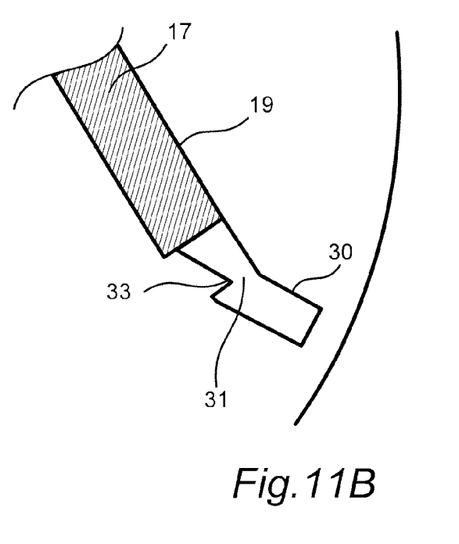
FIG. 11B is a view showing a modification of the projecting part in the embodiments of the present invention.
Figure 11C:
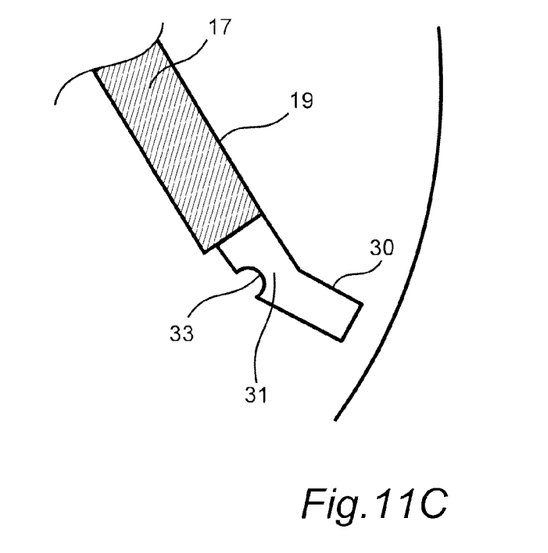
FIG. 11C is a view showing a modification of the projecting part in the embodiments of the present invention.

FIGS. 11A, 11B and 11C are views showing modifications of the projecting part 33 in the embodiments of the present invention.

The projecting part 33 may have any shape as long as the shape satisfies the conditions of the above first to fourth embodiments. The projecting part 33 may have any shape as long as it projects toward the inner side of the flux barrier 30 from the side connected to the magnet fixing part out of the radially outer proximate part 30a and the radially inner proximate part 30b of the flux barrier 30.

For example, in an example shown in FIG. 11A, a rectangular projecting part 33 projects. In an example of FIG. 11B, a triangular projecting part 33 projects. In an example of FIG. 11C, a semicircular projecting part 33 projects.

As just described, the projecting part 33 may be formed to have any shape.

It should be noted that, in the embodiments of the present invention, the flux barrier 30 may be a gap or filled with resin or the like. Further, although the number of the magnet parts 20 is eight, there is no limitation to this. The number of the magnet parts 20 may be any even number, but preferably not smaller than four. Further, the present invention may be applied not only to motors, but also to generators.

Although the embodiments of the present invention have been described above, the above embodiments are only an illustration of some application examples of the present invention and not intended to limit the technical scope of the present invention to the specific configurations of the above embodiments.

This application claims a priority based on Japanese Patent Application No. 2011-257862 filed with the Japan Patent Office on Nov. 25, 2011, all the contents of which are hereby incorporated by reference.

Exclusive nature or features of the embodiments of this invention are claimed as follows.

The invention claimed is:

1. A motor with a stator around which a winding wire is wound, and a rotor housed in the stator and including a plurality of permanent magnets embedded along a circumferential direction, wherein:

the rotor is perforated with magnet holes for embedding the plurality of permanent magnets and a plurality of flux barriers that are gaps communicating with the magnet holes and extending in a rotor circumferential direction;

each of the magnet holes includes a radially outer side surface facing an outer side surface of a permanent magnet of the plurality of permanent magnets in a rotor radial direction, a radially inner side surface facing an inner side surface of the permanent magnet in the rotor radial direction, a magnet fixing part that is a surface extending from an end part of at least one of the radially outer side surface and the radially inner side surface in the rotor circumferential direction and facing an end surface of the permanent magnet in the rotor circumferential direction, and a communicating part communicating with a flux barrier of the plurality of flux barriers;

each flux barrier includes a radially outer proximate part and a radially inner proximate part that are a rotor radially outer side surface and a rotor radially inner side surface extending from the communicating part, at least one of the radially outer proximate part and the radially inner proximate part is connected to an end part of the magnet fixing part of the magnet hole in an inward direction of the magnet hole, and a projecting part projecting in an inward direction of the flux barrier is provided on at least one of the radially outer proximate part and the radially inner proximate part connected to the magnet fixing part;

a constricted part, in which a width of the flux barrier is narrower on a side of the flux barrier that is closer to the projecting part than to the communicating part, is formed by the projecting part;

a distance between the projecting part and an end part of the radially outer proximate part or the radially inner proximate part on a side of the communicating part facing the projecting part across the flux barrier is not shorter than a width of the flux barrier in the rotor radial direction on the communicating part.

2. The motor according to claim 1, wherein:

a ratio of the width of the flux barrier in the rotor radial direction in the constricted part formed by the projecting part to the width of the flux barrier in the rotor radial direction on the communicating part is larger than 0.7.

3. The motor according to claim 1, wherein:

the distance between the projecting part and the end part of the radially outer proximate part or the radially inner proximate part on the side of the communicating part facing the projecting part across the flux barrier is equal to the width of the flux barrier in the rotor radial direction on the communicating part.

4. The motor according to claim 1, wherein:

the radially outer proximate part is connected to the radially outer side surface of the magnet hole, extends outward in the rotor circumferential direction and projects radially inwardly of a rotor core of the rotor, and the radially inner proximate part is connected to a circumferential surface of the magnet hole which extends outward in the rotor circumferential direction from an inner end part of the magnet hole.

\* \* \* \* \*